US006806821B2

(12) United States Patent
McLemore

(10) Patent No.: US 6,806,821 B2
(45) Date of Patent: Oct. 19, 2004

(54) APPARATUS AND METHOD FOR RAPID DETECTION OF OBJECTS WITH TIME DOMAIN IMPULSIVE SIGNALS

(75) Inventor: Donald P. McLemore, Albuquerque, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/385,629

(22) Filed: Mar. 12, 2003

(65) Prior Publication Data
US 2004/0178942 A1 Sep. 16, 2004

(51) Int. Cl.[7] .......................... G01S 13/04; G01S 13/88
(52) U.S. Cl. ........................ 342/22; 342/27; 342/195
(58) Field of Search .......................... 342/22, 27, 60, 342/90, 195

(56) References Cited

U.S. PATENT DOCUMENTS

| 5,446,461 | A | * | 8/1995 | Frazier ........................ 342/22 |
| 5,640,168 | A | | 6/1997 | Heger et al. |
| 5,668,555 | A | | 9/1997 | Starr |
| 6,133,876 | A | | 10/2000 | Fullerton et al. |
| 6,222,481 | B1 | * | 4/2001 | Abrahamson et al. ........ 342/90 |
| 6,297,773 | B1 | | 10/2001 | Fullerton et al. |
| 6,300,903 | B1 | | 10/2001 | Richards et al. |
| 2002/0175850 | A1 | * | 11/2002 | Barnes et al. .................. 342/22 |
| 2003/0090407 | A1 | * | 5/2003 | Santhoff ....................... 342/22 |

OTHER PUBLICATIONS

Daniels, D J., "Ultra–Wideband Impulse Radar", Spread Spectrum Techniques and Applications Proceedings, 1996., IEEE 4th International Symposium on, vol. 1, Sep. 22–25, 1996.*
Carl E. Baum et al., Proceedings of the IEEE, vol. 79, No. 10, Oct. 1991; "The Singularity Expansion Method and Its Application to Target Identification"; pp. 1481–1492, USA.
Carl E. Baum et al., "Singularity Expansion Method, Symmetry and Target Identification", Chapter 1.6.3, pp. 431–447, USA.
Seongman Jang et al., "Exploiting Early Time Response Using the Fractional Fourier Transform for Target Identification", Interaction Notes, Note 580, Feb. 10, 2003, pp. 1–31, USA.

* cited by examiner

Primary Examiner—Ian J. Lobo
(74) Attorney, Agent, or Firm—Burns, Doane, Swecker & Mathis, L.L.P.

(57) ABSTRACT

A method and system are disclosed for detecting objects of interest in a target area using ultra wide band (UWB) RF signals. A transmitter and antenna array generate ultra wide band RF impulsive signals that are used to probe a target area that may include an object of interest. An antenna and a signal processor receive return signals from the target area and process the return signal to generate a set of coordinates. The coordinates of the processed return signals are compared to coordinates of known objects in a pre-existing database to determine whether there is a match between the return signal and a known object. When there is an indication of a match, the existence of the known object is displayed to an operator of the system.

14 Claims, 6 Drawing Sheets

APPARATUS AND METHOD FOR RAPID DETECTION OF OBJECTS WITH TIME DOMAIN IMPULSIVE SIGNALS

BACKGROUND OF THE INVENTION

1. Field of the Invention

The present invention relates to a method and apparatus for detecting objects with time domain impulsive signals, and it more specifically relates to an apparatus and method for detecting visually obscured objects with ultra wide band (UWB) RF signals.

2. Description of the Related Art

UWB technology has been around for several decades, and it has been used for radar-based applications in the past. Developments in high-speed switching technology are making UWB technology more attractive for low-cost consumer communications applications. Many companies are currently working on R&D projects that explore the possibility of extending UWB technology into the high-rate communications arena, and the FCC is setting emissions limits that would permit deployment of UWB communications systems on an unlicensed basis.

An UWB radio is an RF communications device that uses high-bandwidth microwave pulses for transmitting digital data over a wide spectrum of frequency bands using very low power intensity. These devices can transmit data at very high rates (for wireless local area network applications) and very low rates (for telemetry applications). Within the power limit allowed under the current FCC regulations, UWB radios can carry large amounts of data over a short distance, at very low power. An UWB radio has the ability to carry signals through doors and other obstacles that tend to reflect signals at more limited bandwidths and at higher power levels. If higher power levels are used, UWB signals can travel significantly greater ranges.

UWB radio broadcasts use digital pulses timed very precisely. UWB radios do not use sine waves. The transmitter and receiver are highly synchronized, and they send and receive pulses with an accuracy of trillionths of a second. UWB technology is used in very high-resolution radars and precision (sub-centimeter) radio location systems.

Since UWB transmissions are high speed pulses instead of sine waves, UWB transmissions have a high degree of immunity to multipath fading. The constructive and destructive interference created by multiple reflections of the same sine wave signal being received simultaneously is known as multipath fading. This immunity to multipath fading makes UWB technology well suited for applications in environments that would otherwise suffer from multipath fading associated with sine wave transmissions.

UWB devices use the same increasingly crowded radio frequencies that many other systems use. UWB devices typically send out short electromagnetic pulses of half a billionth of a second, and the pulses are followed by pauses that of approximately 200 times that length. By spreading the pulses over a wide area of the spectrum (roughly 1 GHz), UWB devices use extremely low power and wide total bandwidths. UWB technology proponents envision applications such as home security and personal-area networks that activate home appliances. Police and fire departments are currently testing UWB devices that can detect people behind walls.

The government and private industry have an increasing interest in UWB technology. Two main UWB applications of interest are the transmission of large volumes of voice and data at very high speeds with relatively little power, and wall penetrating radars that provide detailed Images of objects behind the wall. Precision locating systems are of interest to military, law enforcement, and rescue agencies. The FCC has approved limited productions of UWB radars for police and rescue workers.

The above described wall penetrating UWB systems may provide a view or image of what is behind a wall or visual impediment, but such systems cannot provide a rapid and certain determination of whether the objects are potentially dangerous objects of interest. Moreover, if the system provides a visual image of what is behind the wall, there is a possibility that the operator of the device may misinterpret the image. Accordingly, there is a need for an UWB detection system that can provide a rapid and certain determination of potentially dangerous objects of interest behind a visual impediment.

SUMMARY OF INVENTION

The present invention provides an UWB detection system and method that can provide a rapid and certain determination of potentially dangerous objects of interest behind walls or visual impediments. Ultra wide band RF impulsive signals are used to probe a target area. The return signals from the target area are received and processed. The processing of the return signals includes decomposing the return signals into time slice feature data. A known object of interest whose preexisting profile has been stored in a database is designated. The probability of detection of a known object of interest is based upon the magnitude of a vector that represents the distance between the time slice feature data and the coordinates of the known object of interest having a preexisting profile. When the magnitude of the vector is less than a predetermined amount, the existence of the known object is displayed to a user of the system.

DETAILED DESCRIPTION OF THE INVENTION

Figure 1:
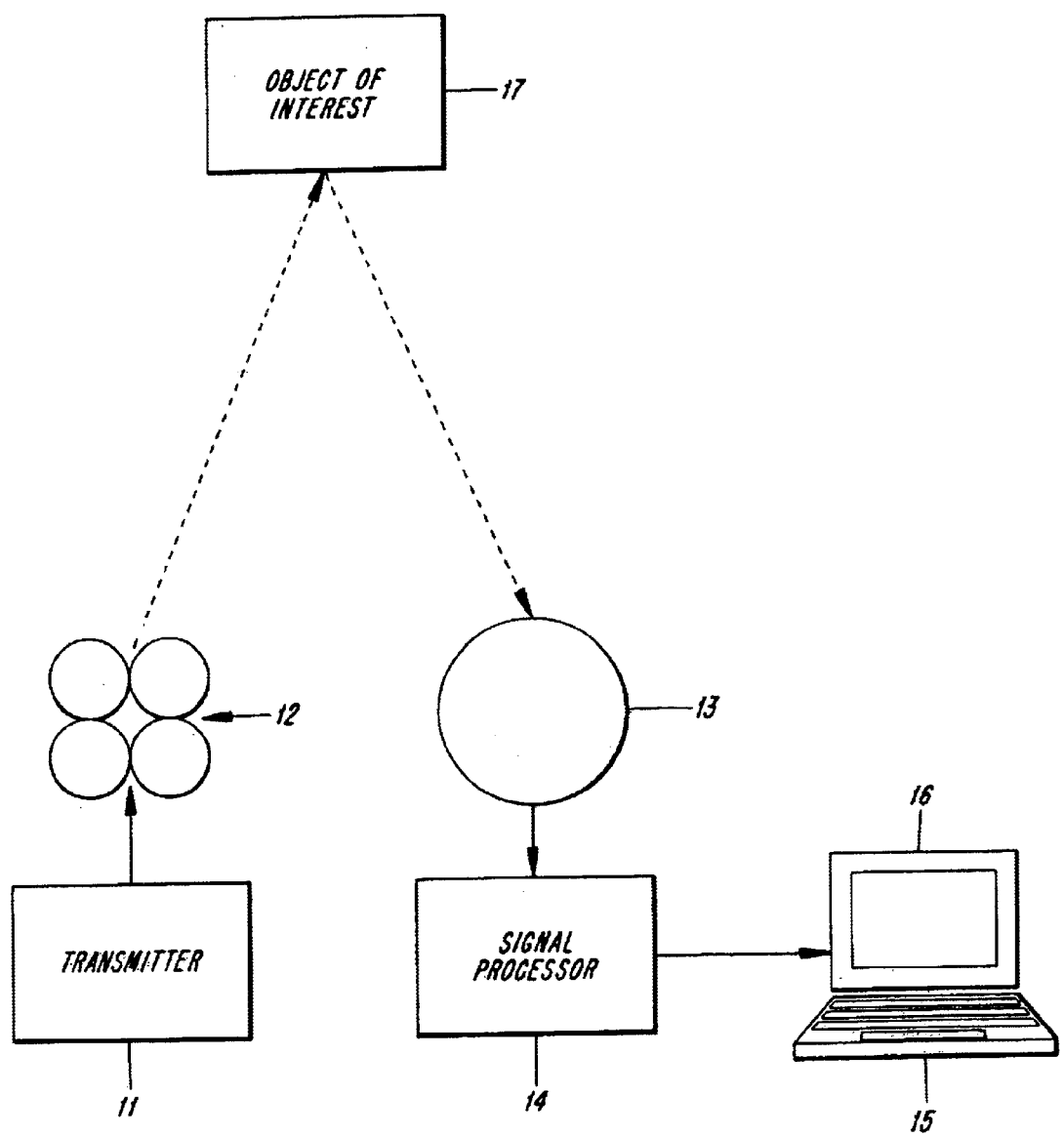
FIG. 1 is a block diagram depicts the equipment of the present invention.

Referring now to FIG. 1, a block diagram depicts the equipment of the present invention. The equipment preferably includes a transmitter 11, an antenna 12 for emitting the UWB pulses, an antenna 13 for receiving the return signals, and a signal processing device 14 for analyzing the return signals, a data processing device 15 for processing signal data and a display 16 for displaying the results. The pulses from the antenna 12 probe an object of interest 17, and the return signals are reflected onto the antenna 13.

In a prototype version of the system, there is a transmitter 11 which includes a two-by-two, solid state, wide-band antenna array 12. A radiating a pulse whose risetime is roughly 100–500 picoseconds and whose fall-time is roughly 5–10 nanoseconds is emitted from the antenna array 12. This antenna array 12 produces an electric field near the transmitter 11 on the order of 5–7 kilovolts/meter. A dc battery powers the transmitter 11. The reflected returns are measured with the impulse-receiving antenna 13 whose receiving dish has a diameter of approximately 1 meter. The received signal is fed into the signal processing device 14 which in the prototype system includes a Tektronics TEK 7404 oscilloscope. The data processing device 16 preferably includes a computer which is connected to the oscilloscope using a TCP/IP protocol and an Ethernet bus. The signals from the oscilloscope are captured in the computer 15 and the signal data is processed. The results of the data processing are then displayed on the display 16 of the computer.

Ideally the system depicted in FIG. 1 can be reduced in size to a man portable system including two units. The first unit would be a hand held antenna 13, similar to a radar gun, for probing a target area for an object of interest 17. The second unit would include the remainder the components of FIG. 1 integrated into a single unit. Potentially, for monostatic operation, these two units could be combined into a single unit having both the radiation and reception performed by the same antenna.

Figure 2:
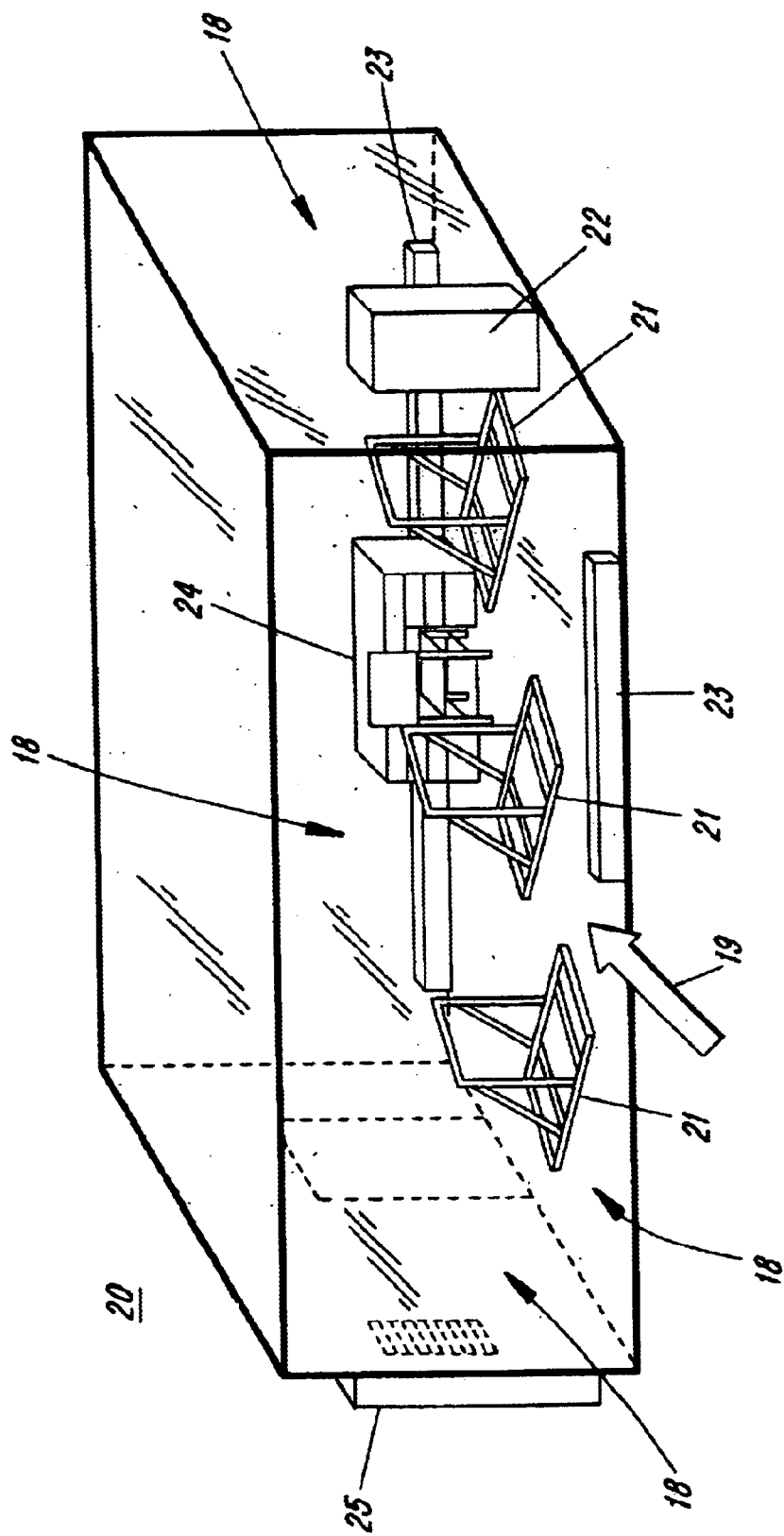
FIG. 2 is an illustration of a building having a room with walls, and it contains at least one object of interest.

Referring now to FIG. 2, there is an illustration of a room 20 having walls 18, and the room 20 contains at least one object of interest 17 that can be detected with the apparatus and method of the present invention. The direction of illumination or probing of the room 20 by the apparatus of the present invention is indicated by the arrow 19. In the room 20, the objects of interest are sitting on racks 21. A file cabinet 22, an electric baseboard heater 23, a desk 24 and an air conditioning unit 25 are also located in the room 20. These objects include stands to hold objects of interest 17, a rack 21. Since the racks 21 may be positioned or oriented at different angles to the detection device of the present invention, the orientation of the racks 21 may further complicate its detection.

Figure 3:
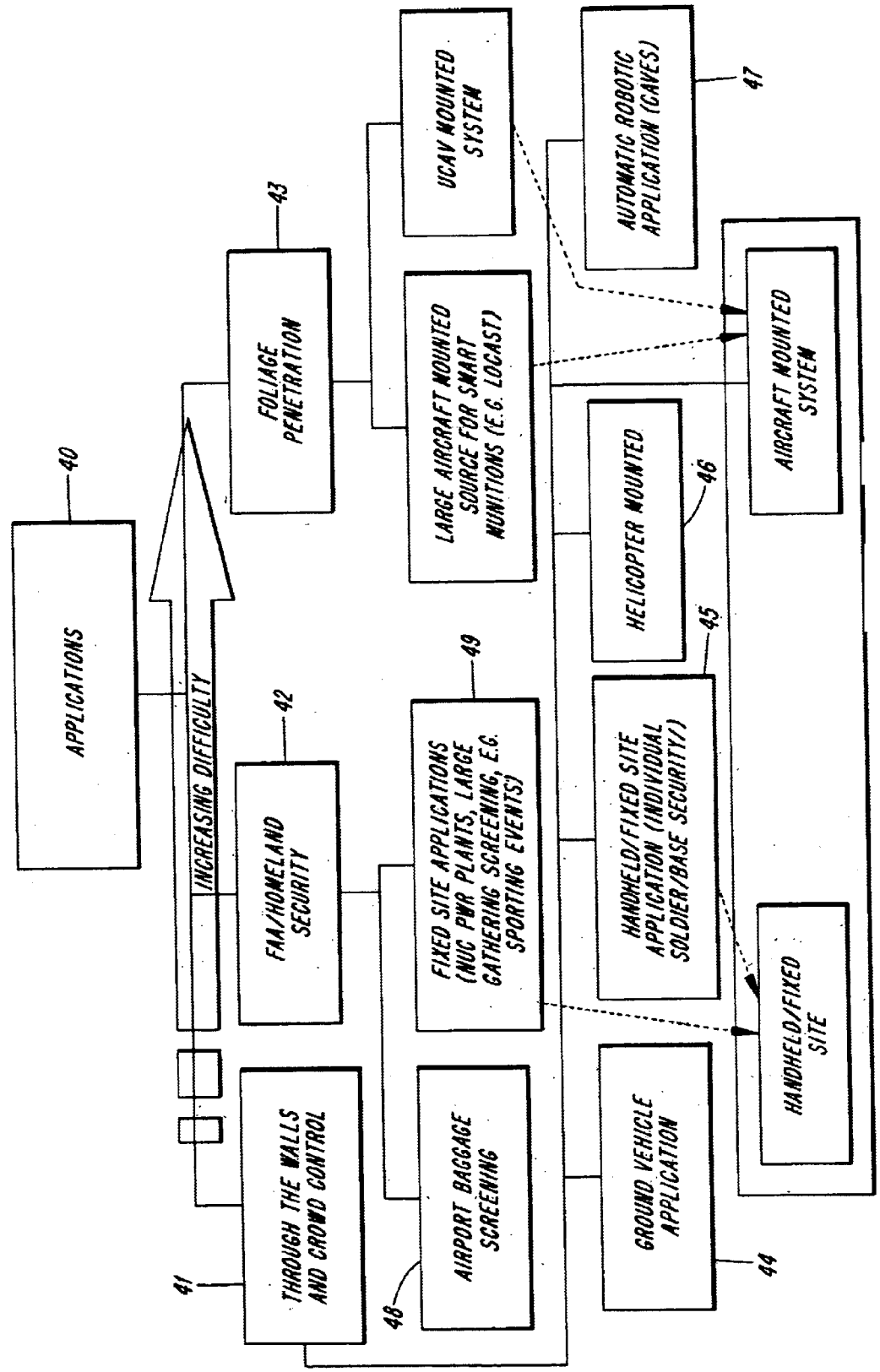
FIG. 3 is a chart that illustrates some applications for implementing the present invention.

The present invention is not limited to the detection of objects of interest that are located behind walls 18. The present invention is applicable to virtually all types of obscurants or visual impediments. Referring now to FIG. 3, a chart illustrates the various applications 40 in which the present invention can be implemented. The chart of FIG. 3, makes it clear that there are environments of increasing difficulty. The least difficult environment is the "through the walls" application and the crowd control application 41. The next more difficult environment is the FAA/Homeland Security application 42. The most difficult environment is the foliage penetration application 43. The "through the walls" application and the crowd control application 41 can be implemented using ground vehicles 44, handheld/fixed sites 45, helicopter mounted applications 46 or automatic robotic applications 47. The FAA/Homeland Security environment 42 would typically include airport baggage screening 48, and it would include fixed site applications 49 including nuclear power plants, large gathering places, etc. The difficult foliage penetration environment 43 would include large aircraft mounted sources for smart munitions 50 and unmanned combat aviation vehicles ("UCAV") 51.

Figure 4:
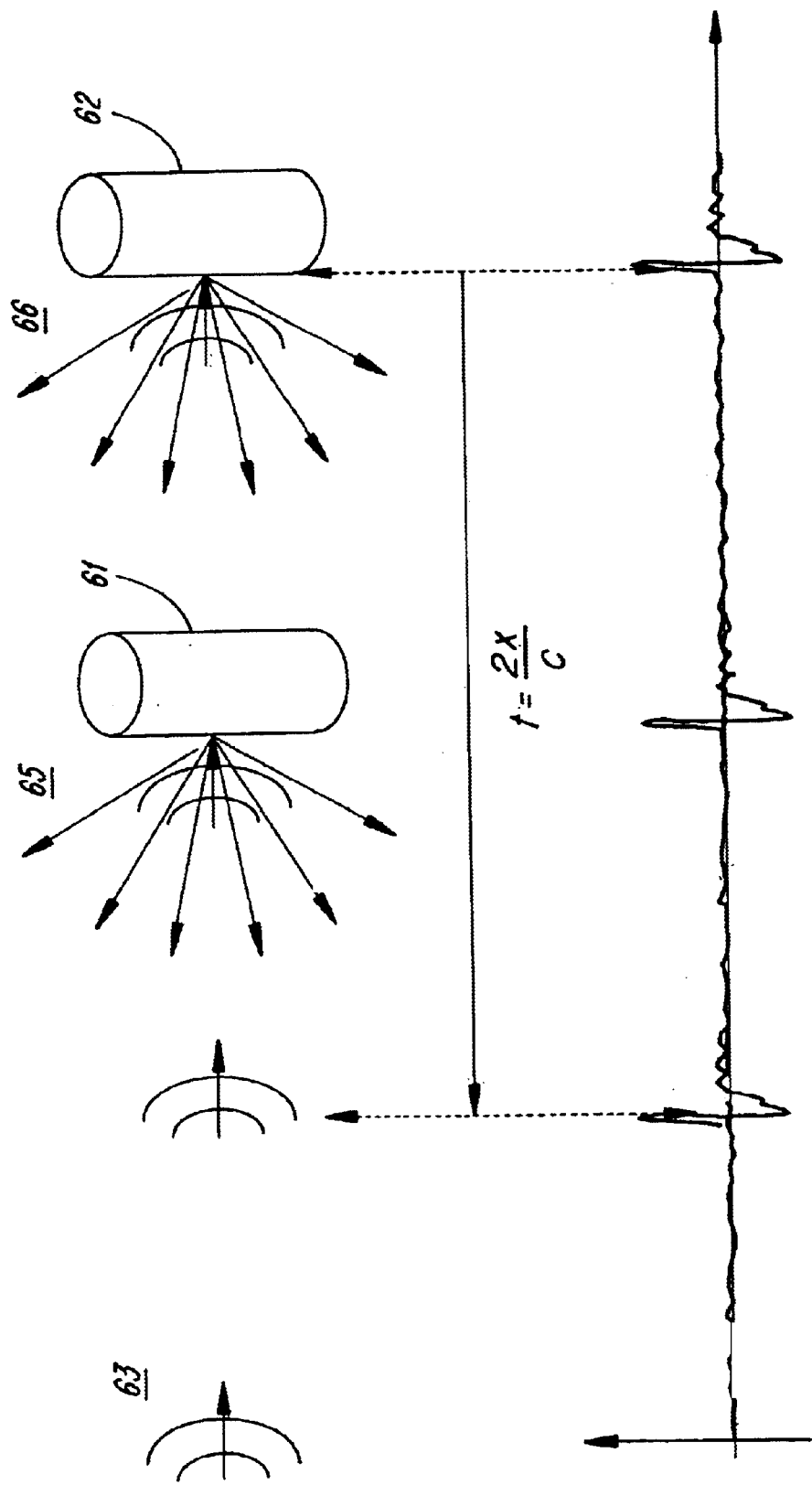
FIG. 4 is a diagram that illustrates a timing simulation associated with the apparatus and method of the present invention.

Referring now to FIG. 4, a diagram illustrates a timing simulation associated with the apparatus and method of the present invention. In FIG. 4, there are two spaced apart cylindrical objects 61, 62 which are being illuminated or probed by an UWB pulse signal 63 that originates at time t=0. The probe signal strikes cylindrical object 61 generating a scattering pattern 65, and it continues on and strikes object 62 generating scattering pattern 66. The probe signal 63 plotted as a function of time is depicted at the bottom of FIG. 4. The present invention makes use of the scattering patterns 65, 66 to detect whether objects 61, 62 are objects of interest.

In order to detect whether an object is an object of interest, the present invention utilizes a database of signatures that are stored in the data processing device 15 of FIG. 1. The signatures of objects of interest are generated in different ways. Preferably, probing the object of interest 17 with an UWB pulse signal at a test range generates a signature. The return signal data is then stored in the data processing device 14, and it is then manipulated to determine the coordinates of the object of interest 17. The signature for a standardized object will be similar irrespective of its orientation. Alternatively, the coordinates of an object of interest could be generated from a plurality of images or photographs of an object taken from different directions. These images or photographs can be transformed into a three dimensional digital profile of the object of interest, and the three dimensional digital profile can be used to compute a simulated return signal for the object of interest.

Determining the probability of the object of interest being located within a real world target area would be time prohibitive, however, if one were to have large libraries of targets and require near real-time determinations. The apparatus and method of the present invention, however, can provide a time saving solution to the detection problem.

Figure 5:
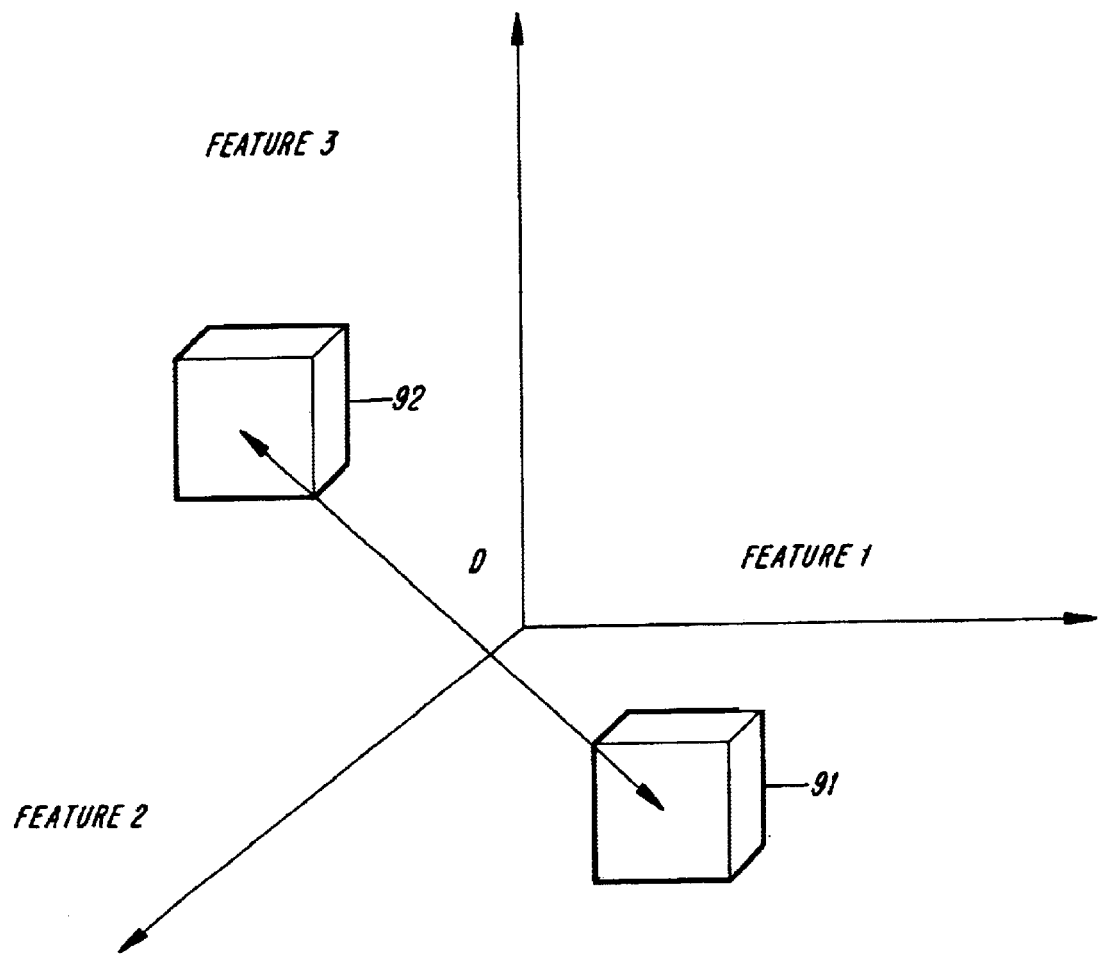
FIG. 5 depicts a three dimensional coordinate system, the actual coordinates of an object of interest located in the target area, and time slice feature data from a return signal.
Figure 6:
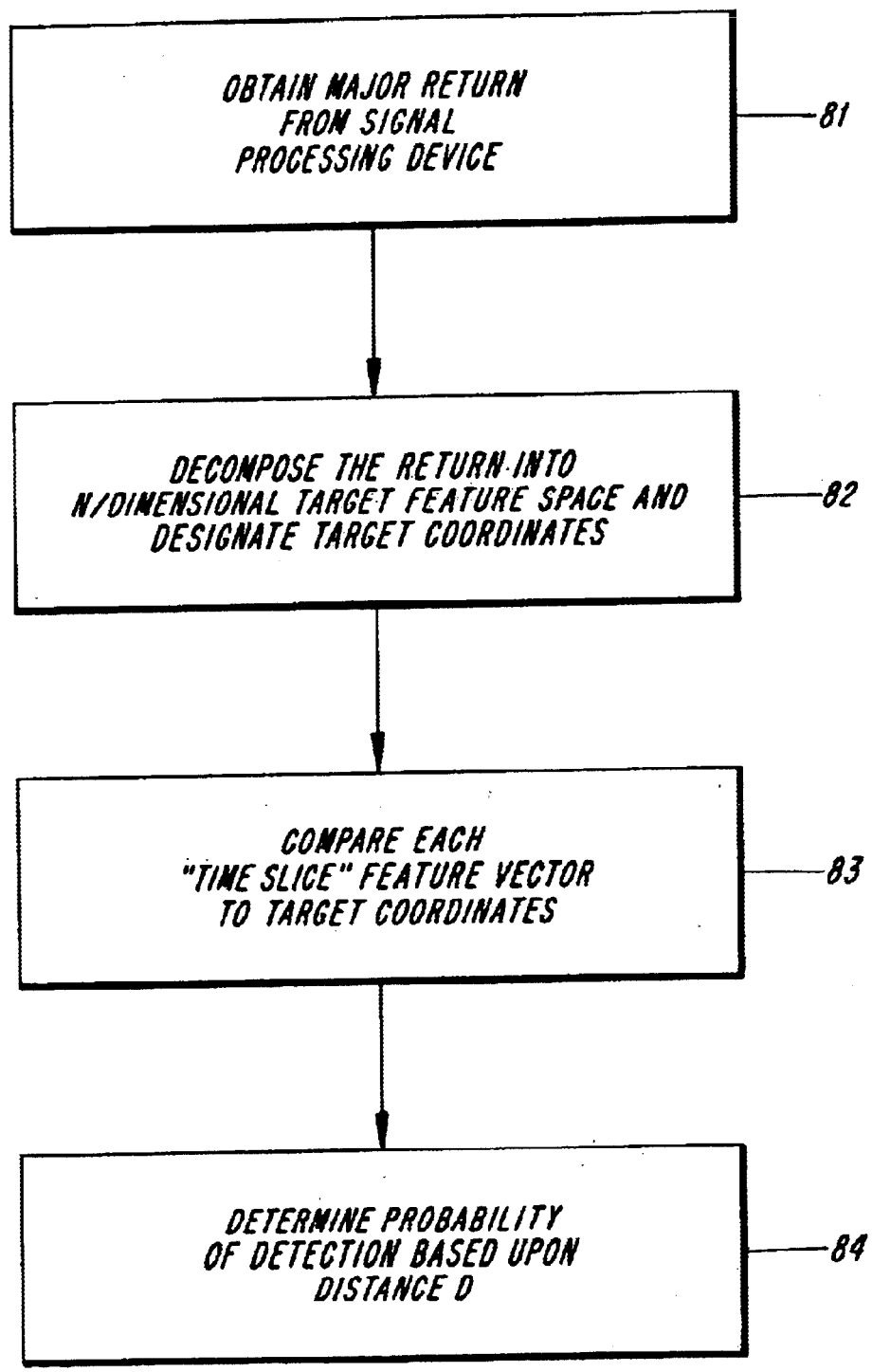
FIG. 6 is a flow chart depicting a method for determining a vector D which indicates a probability of detection.

Referring now to FIGS. 5 and 6, an illustration and a flow chart depict a technique for determining whether an object of interest is located within the target area. The illustration of FIG. 5 depicts a three dimensional coordinate system. This coordinate space is simply a notional representation of "feature" space which could be more than 3 dimensions and will be described in following paragraphs. The actual coordinates 91 of an object of interest are shown in this "feature" space. From an arbitrary portion of the time domain return signal, the time slice feature coordinates 92 are extracted and also depicted in this figure. In this technique, a time slice feature vector D is determined. The time slice feature vector represents the distance between the coordinates 91 of an object of interest and the time slice feature data 92 obtained from a return signal. A smaller value of the vector D indicates a higher probability that the object of interest is located within the target area.

Referring now to FIG. 6, a flow chart depicts a method for determining the vector D. In step 81, a major return is obtained from the signal processing device 14. In step 82, the data processing device 15 decomposes the return signal into N/dimensional feature space, and designates the coordinates of an object of interest. In step 83, each time slice feature vector is compared to the coordinates of an object of interest whose preexisting profile has been stored in a database. In step 84, the probability of detection is determined based upon the magnitude of the vector D.

The question arises about how to determine the feature dimensions and values locating the volume for a known target in this N dimensional feature space. Researchers have found that wideband returns from targets can be expressed as some combination of Gaussian and damped sine functions. As an example of implementing these functions in a similar mathematical functional representation, the half Fourier space is used as described by T. K. Sarkar, Briefing, "Target ID Using Half Fourier Transform (HFT), CEM Lab, Syracuse University, Fall, 2000. The fractional Fourier transform, in general, is written in the form $$X_\alpha(u) = \int_{-\infty}^{\infty} x(t)K_\alpha(t,u)dt \qquad \text{Equation 1}$$

$$x(t) = \int_{-\infty}^{\infty} X_\alpha(u)K_{-\alpha}(t,u)dt$$

where x(t)=original time function $X_\alpha$=fractional Fourier transform

The kernels for this transform are given as $$K_\alpha(t,u) = \sqrt{\frac{1-i\cot\alpha}{2\pi}}\, e^{\frac{i(t^2+u^2)\cot\alpha}{2}} e^{-iut\csc\alpha} \qquad \text{Equation 2}$$

$$K_{-\alpha}(t,u) = \sqrt{\frac{1+i\cot\alpha}{2\pi}}\, e^{\frac{-i(t^2+u^2)\cot\alpha}{2}} e^{iut\csc\alpha}$$

Note that for $\alpha=\pi/2$, this reduces to the familiar Fourier transform, or $$K_{\frac{\pi}{2}}(t,u) = \frac{1}{\sqrt{2\pi}} e^{-iut}$$

$$K_{\frac{\pi}{2}}(t,u) = \frac{1}{\sqrt{2\pi}} e^{iut}$$

Note that for the half Fourier transform, $$\alpha = \frac{\pi}{4}, \qquad \text{Equation 3}$$

$$\cot\left(\frac{\pi}{4}\right) = 1,$$

$$\csc\left(\frac{\pi}{4}\right) = \sqrt{2}$$

$$K_{\frac{\pi}{4}}(t,u) = \sqrt{\frac{1-i}{2\pi}}\, e^{\frac{i(t^2+u^2)}{2}} e^{-iut\sqrt{2}} \qquad \text{Equation 4}$$

$$K_{-\frac{\pi}{4}}(t,u) = \sqrt{\frac{1+i}{2\pi}}\, e^{\frac{-i(t^2+u^2)}{2}} e^{iut\sqrt{2}}$$

Now if we suppose that our wideband return can be characterized by a series $$x(t) = \sum_{n=0}^{\infty} a_n h_n(t)$$

where the constant $a_n$ is found by $$a_n = \int_{-\infty}^{\infty} x(t)h_n(t)dt$$

and we cleverly choose $h_n(t)$ so that $$\int_{-\infty}^{\infty} h_n(t)K_\alpha(t,u)dt = \lambda_n h_n(u)$$

so that the fractional Fourier transform becomes $$X_\alpha(u) = \sum_{n=0}^{\infty} a_n \lambda_n h_n(u) \qquad \text{Equation 5}$$

Sarkar shows that, when one uses Hermite polynomials, $H_n(t)$, $$\int_{-\infty}^{\infty} e^{-\frac{t^2}{2}} H_n(t)K_\alpha(t,u)dt = e^{-in\alpha} e^{-\frac{u^2}{2}} H_n(u)$$

which further suggests, when we express our time domain function in terms of these polynomials, that $$h_n(t) = e^{-\frac{t^2}{2}} H_n(t) \qquad \text{Equation 6}$$

$$\lambda_n = e^{-in\alpha}$$

where the Hermite polynomials are found by the usual recursion relationship $H_0=1$, $H_1(x)=2x$, $H_{n+1}(x)=2xH_n(x)-2nH_{n-1}(x)$ Now examining equations 5 and 6, one gets a sense of how the definition of the n dimensional "feature" space can be defined and specified for a group of known targets. N, the dimension of the feature space, becomes the number of hermite functions needed to accurately express the Gaussian or damped sine functions used to model the wide-band return (within a specified error). The constant $a_n$ values with their respective uncertainties, $\Delta a_n$, then define the N-dimensional "shape" for the target features in the library, the volume of this shape arising from the uncertainties in the point specification for the $a_n$.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents that fall within the scope of the claims are intended to be embraced therein.

I claim:

1. A method for detecting objects of interest in a target area using ultra wide band (UWB) RF impulsive signals, comprising the steps of:
    a) probing the target area with the ultra wide band RF impulsive signals;
    b) receiving return signals from the target area;
    c) processing the return signals by decomposing the return signals into time slice feature data;
    d) designating coordinates of a known object of interest whose preexisting profile has been stored in a database;
    e) determining the probability of detection of a known object of interest based upon the magnitude of a vector which represents the distance between the time slice feature data and the coordinates of a known object of interest having a preexisting profile; and
    f) displaying the existence of the known object, when the magnitude of the vector is less than a predetermined amount.

2. The method according to claim 1 wherein the coordinates of the known objects are stored in a database of signatures.

3. The method according to claim 1 wherein the object of interest is located behind a wall.

4. The method according to claim 1 wherein the object of interest is concealed on a person.

5. The method according to claim 1 wherein the object of interest is obscured by foliage.

6. The method according to claim 1 wherein the object of interest is detected from a vehicle.

7. The method according to claim 1 wherein the determining step includes the use of half fourier transforms.

8. An apparatus for detecting objects of interest in a target area using ultra wide band (UWB) RF impulsive signals, comprising the steps of:
   a) a transmitter for probing the target area with the ultra wide band RF impulsive signals;
   b) a receiver for receiving return signals from the target area;
   c) a signal processor for processing the return signals by decomposing the return signals into time slice feature data;
   d) means for designating coordinates of a known object of interest whose preexisting profile has been stored in a database;
   e) means for determining the probability of detection of a known object of interest based upon the magnitude of a vector which represents the distance between the time slice feature data and the coordinates of a known object of interest having a preexisting profile; and
   f) a display for displaying the existence of the known object, when the magnitude of the vector is less than a predetermined amount.

9. The apparatus according to claim 8 wherein the transmitter includes an antenna.

10. The apparatus according to claim 9 wherein the receiver includes an antenna.

11. The apparatus according to claim 10 wherein the receiver and transmitter share a single antenna.

12. The apparatus according to claim 8 wherein the apparatus is mounted in a ground vehicle.

13. The apparatus according to claim 8 wherein the apparatus is mounted in an airborne vehicle.

14. The apparatus according to claim 11 wherein the apparatus is a handheld unit.

\* \* \* \* \*